United States Patent [19]
Bassetti et al.

[11] Patent Number: 4,544,264
[45] Date of Patent: Oct. 1, 1985

[54] FINE LINE PRINT ENHANCEMENT

[75] Inventors: Larry W. Bassetti; Sherwood Kantor, both of Boulder, Colo.

[73] Assignee: International Business Machines Corporation, Armonk, N.Y.

[21] Appl. No.: 611,443

[22] Filed: May 17, 1984

[51] Int. Cl.[4] .......................................... G03G 15/00
[52] U.S. Cl. ................................ 355/14 R; 355/3 R; 358/287; 358/300
[58] Field of Search ................... 355/8, 1, 3 R, 14 R, 355/14 C, 80, 3 DD, 1; 358/300, 283, 287, 298; 430/54, 396, 902; 118/624

[56] References Cited
U.S. PATENT DOCUMENTS

| 3,564,131 | 2/1971 | Herold et al. | 178/15 X |
| 3,574,458 | 4/1971 | French | 355/80 |
| 3,649,261 | 3/1972 | Dahlquist et al. | 355/3 R X |
| 3,881,927 | 5/1975 | Fantuzzo | 355/3 DD X |
| 3,905,822 | 9/1975 | Marks | 118/624 X |
| 3,912,510 | 10/1975 | Marks | 355/3 R X |
| 4,336,993 | 6/1982 | Banton | 355/3 R |
| 4,344,713 | 8/1982 | Cullen | 355/3 R X |
| 4,365,275 | 12/1982 | Berman et al. | 358/283 |
| 4,408,868 | 10/1983 | Thomas et al. | 355/14 R |
| 4,417,805 | 11/1983 | Kishi | 355/14 R |
| 4,447,126 | 5/1984 | Heidrich et al. | 355/1 X |

OTHER PUBLICATIONS

IBM Technical Disclosure Bulletin, "Improving Resolution of a Laser Beam Printer", R. J. Froess & F. L. Wade, vol. 26, No. 3B, Aug. 1983, pp. 1572-1573.

Primary Examiner—A. C. Prescott
Attorney, Agent, or Firm—Charles E. Rohrer

[57] ABSTRACT

This discloses an electrophotographic printing machine with circuits to enhance the printing of fine lines, such as lines of a single picture element (pel) in width. Provision is made for broadening such lines in one dimension by adding small "black" areas to each edge of the fine line in order to broaden it. In a second dimension, perpendicular to the first dimension, lines are broadened by placing gray pels next to black pels. The disclosure also discusses specific cases in which it may be considered desirable to inhibit the enhancement signals.

36 Claims, 18 Drawing Figures

FIG. 7A

↓ SCAN

| PEL | C | B | A | IA |
|-----|---|---|---|----|
| 1   | W | W | W | W  |
| 2   | W | W | W | W  |
| 3   | W | G | B | W  |
| 4   | G | B | B | W  |
| 5   | G | B | W | W  |
| 6   | W | W | W | W  |
| 7   | W | G | B | W  |
| 8   | W | W | W | W  |
| 9   | G | B | W | W  |
| 10  | W | W | W | W  |

FIG. 7B

|   |   | G | B |
|---|---|---|---|
|   |   | G | B |
| 300 |  | G | B |
| B | B | B | B |
|   |   | G | B |
| 301 |  | G | B |
|   |   | G | B |

FIG. 7C

| B | B | B |
|---|---|---|
| B | W | B |
| B | B | B |

FIG. 7D

| B | B | B |
|---|---|---|
| B | G | B |  ← 302
| B | B | B |

[G] – GRAY

⊠ – ADDED BLACK

FINE LINE PRINT ENHANCEMENT

This invention relates to printing machines such as a laser electrophotographic printer and more specifically relates to enhancing the printing of fine lines, for example, a line comprised of only a single picture element (pel) in width.

RELATED INVENTIONS

U.S. patent application Ser. No. 332,382, filed Dec. 18, 1981, relates to a method and apparatus for enhancing print produced by an electrophotographic printer. In that invention, gray picture elements are added at certain transition areas between white and black picture elements. The purpose is to smooth transitions along diagonal lines where staircase effects are sometimes visible to the human eye.

Ser. No. 611,561, filed concurrently herewith, combines the principles of the enhancement techniques disclosed in the aforementioned patent application with the principles of the enhancement techniques provided by this invention and resolves interrelational conflicts which the different print enhancement techniques cause.

BACKGROUND OF THE INVENTION

Many printing machines are designed to create an image by placing a series of picture elements (pels) on the image receiving material. For example, in electrophotographic printing machines, an image may be created by a light source which is caused to scan across photosensitive material in a succession of scan lines. The light beam places a series of overlapping pels on the charged surface of photosensitive material. Each pel is placed in a pel area and the light beam is modulated so that some pel areas are exposed to light and some are not. Wherever a pel containing light strikes the photosensitive material, it is discharged. In that manner, the photosensitive material is caused to bear a charge pattern of pels which images the subject that is being reproduced. The printed copy is obtained by developing the charge pattern and transferring the developed image to print material, usually paper.

The resolution of images produced by a laser electrophotographic machine is generally stated in the number of pels produced per inch. For example, a 300-pel per inch electrophotographic printer has higher resolution than a 240-pel per inch printer. While the visual characteristics of print are generally better when a higher number of pels per inch are used, in one area the visual characteristics are made worse. That area is the printing of narrow fine lines, for example, lines of a single pel width. The reason is that as the number of pels per inch increase, the width of a single pel decreases. This decrease in pel width is made even more severe by the overlapping pel structure used in electrophotographic printing machines. The invention herein is apparatus and technique which causes the enhancement of the printing of fine lines such as lines of a single pel width and provides for such enhancement in two dimensions. That is, the printing of fine lines in a direction perpendicular to the scan direction is enhanced as well as the printing of fine lines which occur in a direction parallel to the scan direction.

SUMMARY OF THE INVENTION

This invention provides for enhancing the printing of fine lines in a direction parallel to the scan direction by providing a gray energy density level on the photosensitive material on at least one side of the line. The result is to broaden the line when printed which significantly enhances the printing of such lines. For fine lines in a direction perpendicular to the scan direction, the line is broadened by increasing the time period for pel modulation a predetermined amount beyond the normal pel period. This adds to the size of the line.

Circuits are provided to implement the techniques stated above and are placed between the character generator and the laser printhead. In the particular embodiment described herein, incoming data from the character generator is viewed by the enhancement circuit which analyzes the data and generates the needed gray and/or enlarged pulses as needed. Provision is also made for inhibiting the enhanced pulses in certain situations where they conflict with each other and consequently might actually degrade the printed product.

BRIEF DESCRIPTION OF THE DRAWING

The above-mentioned and other features and objects of this invention and the manner of attaining them will become more apparent and the invention itself will best be understood by reference to the following description of embodiments of the invention taken in conjunction with the accompanying drawing, the description of which follows.

FIG. 7, comprised of FIGS. 7A–7D, are diagrams illustrating the arrangement of pel signals.

DETAILED DESCRIPTION

A. In General

Figure 1:
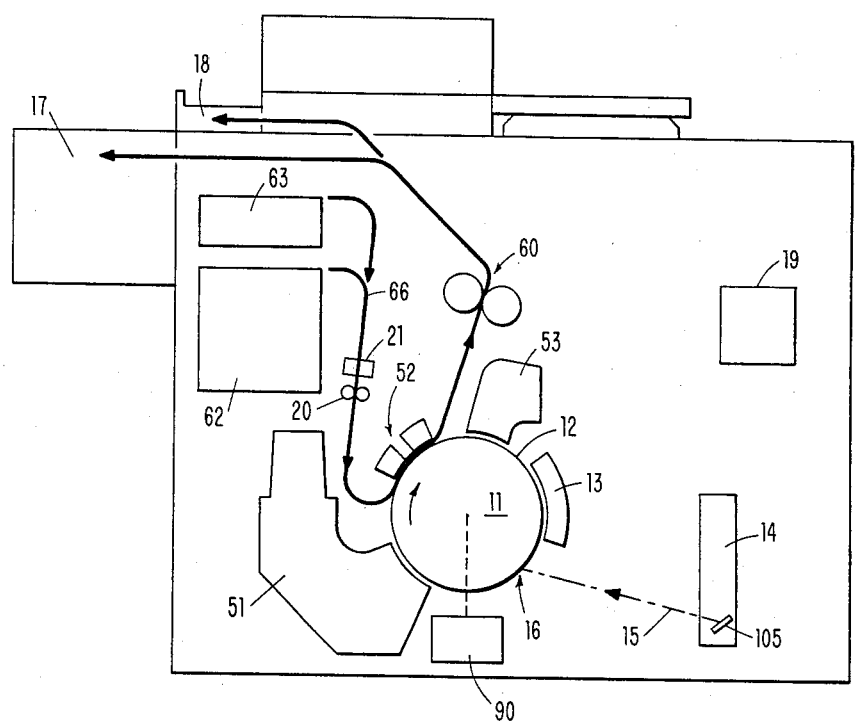
FIG. 1 shows a typical electrophotographic printing machine.

In electrophotographic printing machines, prints are produced by creating an electrostatic representation of the print on a photoreceptive surface, developing the image and then fusing the image to print material. In machines which utilize plain bond paper or other image receiving material not coated with photoreceptive material, the electrophotographic process is of the transfer type where photoreceptive material is placed around a rotating drum or arranged as a belt to be driven by a system of rollers. In a typical transfer process, photoreceptive material is passed under a stationary charge generating station to place a relatively uniform electrostatic charge, usually several hundred volts, across the entirety of the photoreceptive surface. Next, the photoreceptor is moved to an imaging station where it receives light rays generated by a light source. In electrophotographic printing machines such as the IBM 6670 Information Distributor, positive images are produced through the use of light rays which discharge the photoreceptive material in white or background areas to relatively low levels while areas which are desired to print out as dark areas continue to carry high voltage levels after the exposure. In that manner, the photoreceptive material is caused to bear a positive charge pattern corresponding to the printing, shading, etc. which is desired. In the production of a negative image used in machines such as the IBM 3800 Electrophotographic Printer, light rays are used to discharge the photoreceptive material in the foreground areas (dark areas).

After producing an image on the photoreceptor, the image is sent to a developing station where developing material called toner is placed on the image. This material may be in the form of a black powder or liquid and, in a system which produces a positive image, the material carries a charge opposite in polarity to the charge pattern on the photoreceptor. In a negative image system, the toner carries the same polarity as the charge on the photoreceptor. Because of the attraction of the charged toner to the photoreceptor, it adheres to the photoreceptor surface in proportions related to the shading of the image. Thus, black character printing receives heavy toner deposits and white background areas should receive none.

A developed image is moved from a developer to a transfer station where image receiving material, usually paper, is juxtaposed to the developed image on the photoreceptor. A charge is placed on the backside of the paper so that when the paper is stripped from the photoreceptor, the toner material is held on the paper and removed from the photoreceptor. The remaining process steps call for permanently bonding the transferred toner material to the paper and cleaning residual toner left on the photoreceptor after the transfer operation. Thereafter, the photoconductor is reused for subsequent print production.

A common variation on the above-described process used in many electrophotographic machines, involves the use of specially prepared image receiving material which itself is coated with a photosensitive material. By utilizing that technique, the image is electrostatically placed directly on the image receiving paper thereby avoiding the transfer operation. In this process, after exposure the paper is sent through a developer and then to a fuser for permanent bonding. Machines of this type avoid the residual toner problem and therefore avoid the need for cleaning stations. However, the resulting paper with its special photosensitive coating is more expensive than plain bond paper and special coating is considered to detract from the resulting product.

As a consequence, coated paper machines are usually used only for low volume applications or where quality product is not essential.

Production of the image on the photoreceptive surface can be produced by a scanning light beam where the desired characters are produced by driving a light generating source from information held in digital memory. The generating source may be a laser gun, an array of light-emitting diodes, etc. which direct light rays to the photoreceptor and cause it to bear the desired charge pattern.

An example of a light scanning and printing system such as is employed in the IBM 6670 Information Distributor is disclosed in U.S. Pat. No. 3,750,189. In that system, a laser beam is directed through a collimating lens system and focused as a line on a rotating mirror. The reflected beam is passed through a combination of a toroidal and a spherical lens to focus the line image on the final image plane, that is, the photoreceptor. The shape of the focused beam on the photoreceptor is designed to be slightly elliptical in order to compensate for the different image forming properties of the optical system in the scan and nonscan directions.

The type of light source provided in the IBM 6670 Information Distributor is a helium-neon laser generating source. This source provides a continuous laser beam which is modulated by an acousto-optic modulator to carry the digital information desired for reproduction. The current invention may be used with a helium-neon laser source but the particular implementation to be described herein is designed for use with a solid-state laser source. Modulation of a solid-state laser source is usually accomplished by switching the laser beam on and off in accordance with the digital information desired for reproduction. An optical system for use with a solid-state laser generating source is the subject of U.S. patent application Ser. No. 472,430, filed on Mar. 7, 1983. That patent application describes an optical system which includes an achromatic doublet lens positioned adjacent to the solid-state laser generating source together with an aperture located just prior to the achromatic doublet lens. The doublet lens collimates the beam and passes it to a cylindrical lens for focusing the beam onto the surface of a rotating mirror and then through a toroidal lens together with a spherical lens to focus the beam onto a moving photoreceptive surface.

Whether a continuous laser beam modulated by an acousto-optic modulator or a solid-state laser beam modulated by a switching circuit is used, the resultant image is formed by a series of overlapping picture elements, each picture element being small relatively circular dots placed adjacent to each other in an overlapping relationship. Adjacent pels overlap along each scan line and also overlap with adjacent pels on directly adjacent scan lines.

FIG. 1 shows a typical electrophotographic laser printing machine. An electrophotographic drum 11 is driven by motor 90 in direction A. Drum 11 carries photosensitive material 12 which passes under a charge corona generator 13 to charge the photoreceptive material to a suitable voltage. Next, the photoreceptive material 12 is discharged at exposure station 16 in accordance with the image desired to be reproduced. That image is produced by a module 14 consisting of a character generator and a laser printhead which produces the modulated laser beam 15. Next, the latent image is developed at the developer station 51 and transferred by a transfer corona generator 52 to image receiving material (typically copy paper) traversing the paper path 66. Photoreceptive material 12 then continues to the cleaning station 53 before repeating the cycle to receive another image. Copy paper may be stored in either bin 62 or 63 and fed into the paper path 66 to a gate 21. Copy paper is released by gate 21 and passed along the paper path through pinch rolls 20 through the transfer station 52 and on to the fusing rolls 60. The finished print is then passed to an exit pocket 18 or to a finishing station 17. Module 19 represents the control circuits which operate the machine in its intended manner and may be based on any suitable microprocessor or set of microprocessors.

Figure 2:
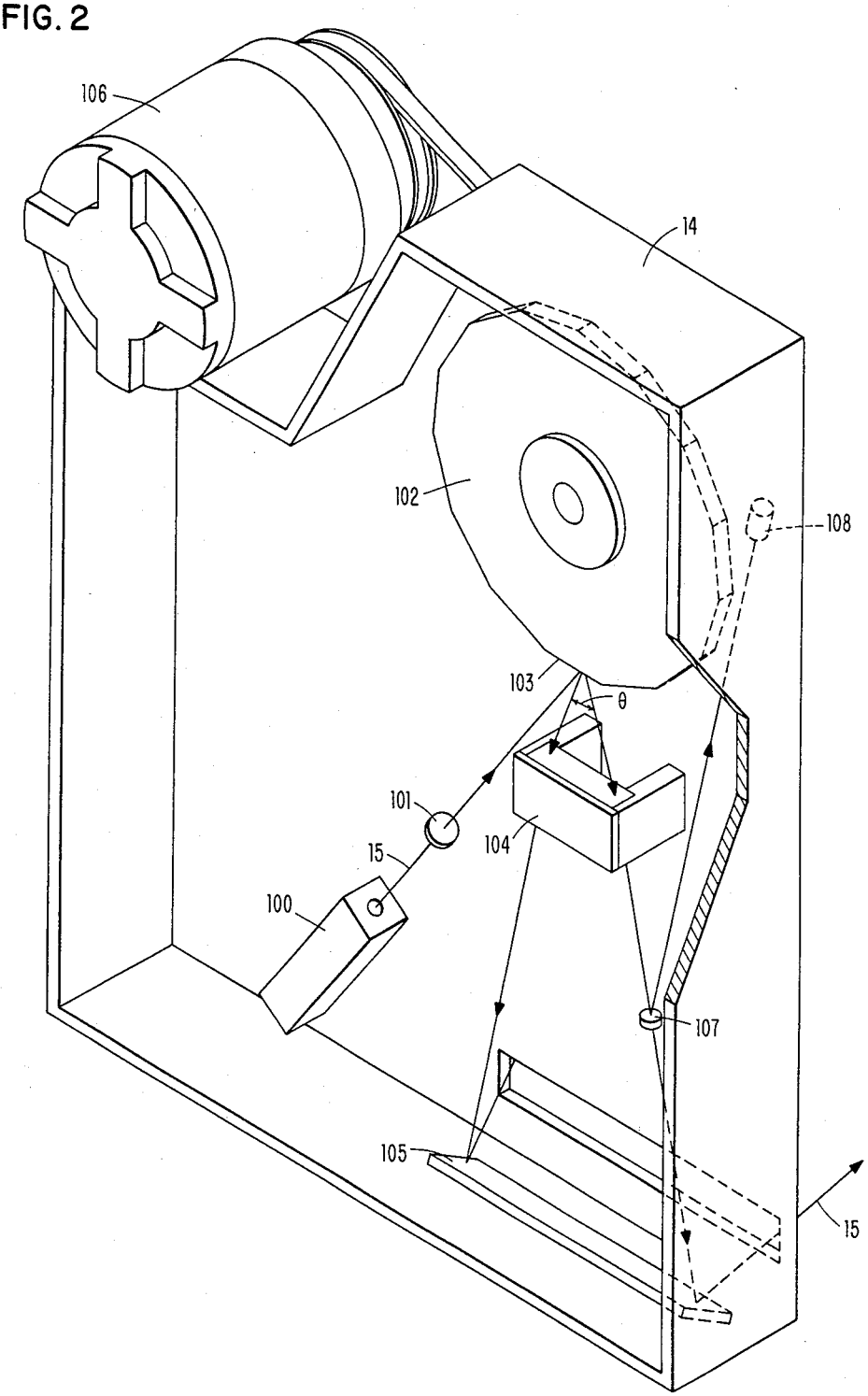
FIG. 2 shows solid-state laser apparatus for producing a scanning laser beam for the machine of FIG. 1.

Optical system module 14 is shown in detail in FIG. 2 where a solid-state laser chip and a collimating lens are housed in assembly 100. Laser beam 15 passes from assembly 100 through cylindrical lens 101 to a rotating mirror 102 which has a plurality of facets such as facet 103 around its periphery. The laser beam is reflected from a single facet at a time in such a manner as to scan through an angle $\theta$. As each succeeding facet of the rotating mirror 102 rotates into position to receive beam 15, another scan through the angle $\theta$ begins. Upon reflection from the rotating mirror facet, the laser beam is passed through assembly 104 at which a toroidal lens and a spherical lens are used to finally shape the beam and to focus it on the photoreceptive surface 12 shown in FIG. 1. A beam fold mirror 105 is shown in both FIGS. 1 and 2 illustrating the final folding mechanism to direct the laser beam to the photoreceptive surface 12. Motor 106 is provided to drive the rotating mirror 102 while a start-of-scan mirror 107 is provided to direct the laser beam to a start-of-scan detector 108.

It should be noted that a single scan line on photoreceptive material 12 is produced by the reflection of the laser beam across a single facet on rotating mirror 102. The scan line is comprised of a succession of overlapping picture elements (pels) which may be, for example, 240 pels per inch. In such a case, each square inch on the photoconductor would carry 240×240 pels. The photoreceptor may be scanned in either a vertical or a horizontal direction relative to the receiving material, it may be scanned from either left or right, the scan can proceed from top to bottom, or bottom to top depending upon the particular implementation in the machine. Finally, to produce a positive image, the light beam is modulated to print the background while in a negative system the laser beam is modulated to produce the printing.

B. The Enhanced Result

Figure 8A:
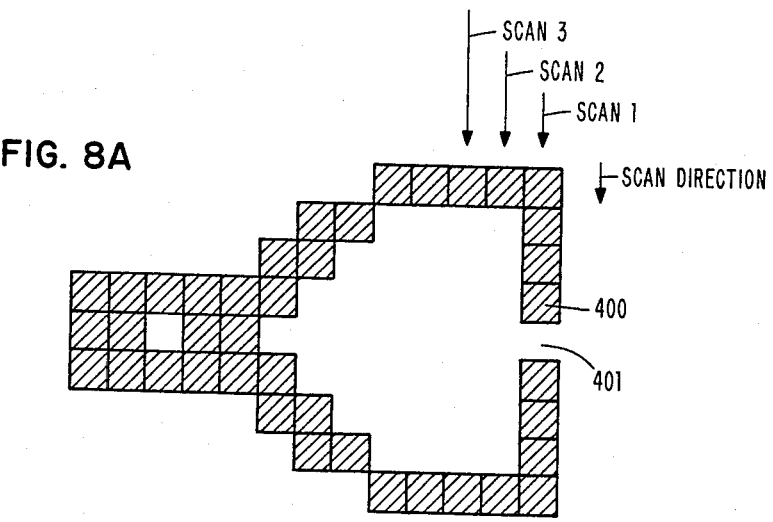
FIG. 8, comprised of FIGS. 8A and 8B, illustrate the desired signals produced by the circuit shown in FIG. 5.
Figure 8B:
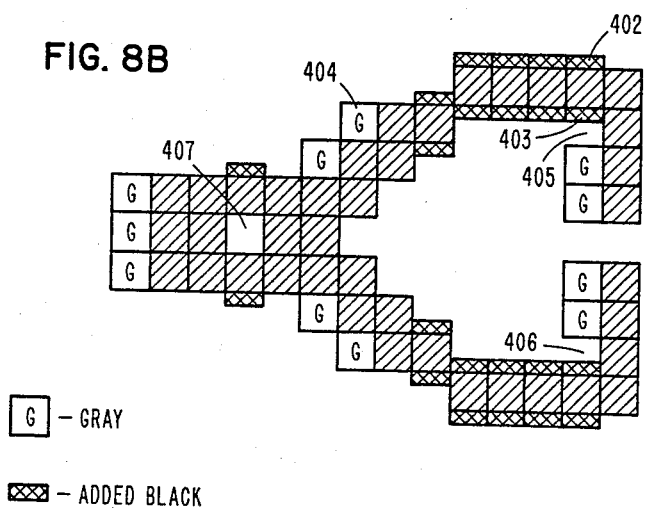
Figure 9A:
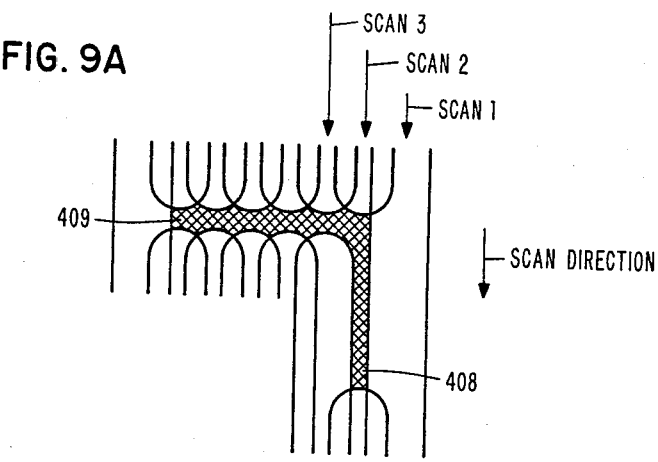
FIG. 9, comprised of FIGS. 9A–9C, illustrate the desired printed end result.
Figure 9B:
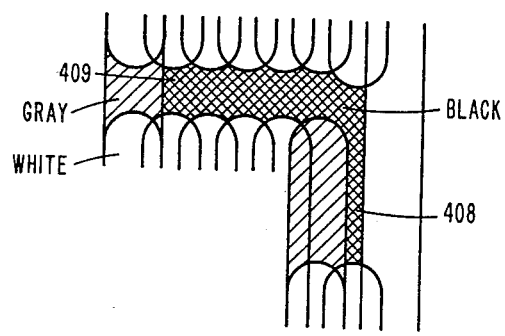

Before describing the particular embodiment and the implementing circuits shown in FIGS. 3–7, reference is made FIGS. 8A, 8B, 9A, 9B, and 9C. These figures illustrate the results obtained through use of the print enhancement technique. The figures illustrate results obtained regardless of whether positive or negative development occurs. Fine line data is illustrated as data of only one pel in width. The overlapping nature of the pel structure is shown in FIGS. 9A and 9B.

FIG. 8A is a representation of normal print data signals that might be provided to a printhead by the character generating circuit with no print enhancement features present. In FIG. 8A, a laser beam is caused to scan in a direction from the top of the page to the bottom and each successive scan line is produced from right to left. Black pel data is illustrated by crosshatched areas 400 while white pel data signals are illustrated by the blank squares 401.

FIG. 8B shows the identical data of FIG. 8A as modified by the particular print enhancement technique which will be described below with reference to the implementing circuits. Note that where single pel width black data occurs in a direction perpendicular to the scan direction, a small additional black signal 402 is added on the leading edge of the single width black pel. Also note that a small additional black signal 403 is added on the trailing edge of the single width black pel. In that manner, the single width black pel signal is broadened.

FIG. 8B also shows a representation of gray pel data 404 located between certain white and black pels. Essentially, the gray pel signal is added at each black to white transition where the black pel signal precedes the white pel signal in a direction parallel to scan. The gray pels are not added at transitions from white to black in the particular implementation to be described. Addition of gray pel signals as shown broadens printed black single pel width lines in a direction parallel to scan. The phenomenon of expanding black printed areas and not producing a gray printed area is a result of the overlapping pel infrastructure coupled with the electrophotographic process and is fully explained in U.S. patent application Ser. No. 332,382, referenced above.

It should be noted that print enhancement in a direction parallel to scan is not limited to single pel width lines but is added wherever the transition occurs from black to white. If desired, a circuit could be devised which would add the gray pel signal only where single pel width lines are encountered in a direction parallel to scan. Such a circuit would be within the scope of this invention.

It should also be noted in FIG. 8B that gray pel signals have been inhibited at pel signal locations 405 and 406. In the implementation to be described, gray is inhibited whenever a gray pel signal and an added black signal occur in the same pel area. The added black signal is not inhibited in such a case. Note also in pel location 407, that the print enhancement techniques would cause added black signals at both the leading and trailing edges of that pel location as well as causing a gray pel signal to occur. However, where the same pel location has an added black trailing edge signal, an added black leading edge signal, and gray pel data all present, all of the enhancement signals are inhibited. In that manner, the probability of printing an easily discernible white pel is enhanced.

FIG. 9A is a representation of normal print output on the photoreceptive surface produced without the use of print enhancement techniques of this invention. In FIG. 9A, the scan direction is once again from top to bottom and successive lines are printed from right to left. The overlapping nature of the pels in the different lines is clearly shown in FIG. 9A. Note that the single pel width black printed line in line 2 is considerably narrower than the pel data itself since a portion of the black data is erased by the overlapping white pel data in directly adjacent line 3 and another portion is erased by the overlapping white pel data in directly adjacent line 1. Similarly, note that the printed single pel width line 409 is made more narrow than the pel data itself due to the overlapping nature of the white pels immediately preceding and immediately succeeding the black data.

FIG. 9B shows another representation of output data (not actual print output) on the photoreceptive surface. The output data drives the printhead where the enhancement circuits of the instant invention are used. Note that line 408 is to be enhanced by the formation of gray pels in line 3 replacing the white pels of FIG. 9A. Additionally, in line 409, note that added black pulses are located in the pel locations immediately preceding and immediately succeeding the black pel data in order to broaden line 409.

Figure 9C:
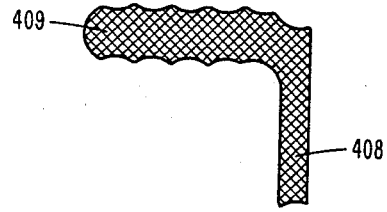

FIG. 9C shows the actual printed output which is achieved by an electrophotographic machine using print enhancement as taught herein. The important point to note is that the final output does not reveal a gray area adjacent line 408 but rather the black portion of line 408 is broadened. This is due to the effect on the gray/black region caused by the electrophotographic process. This phenomenon is explained more fully in U.S. patent application Ser. No. 332,382 mentioned above.

C. The Circuits

Figure 3:
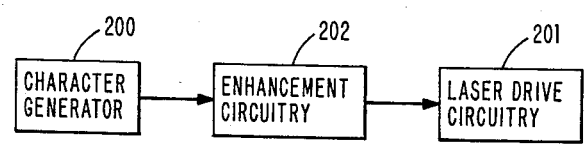
FIG. 3 is a block diagram showing the position of enhancement circuitry in accordance with this invention.

FIG. 3 is a block diagram showing the position of circuit components to enhance the printed image according to this invention and is directed to an embodiment for use with the electrophotographic laser printer shown in FIGS. 1 and 2. A character generator 200 provides signals to modulate the laser beam 15 (FIG. 2) to provide the desired characters. Data from the character generator is provided to laser drive circuitry 201. As shown in FIG. 3, the circuit of this invention provides print enhancement circuits 202 between the character generator and the laser drive circuitry so that single pel lines may be enhanced.

Figure 4:
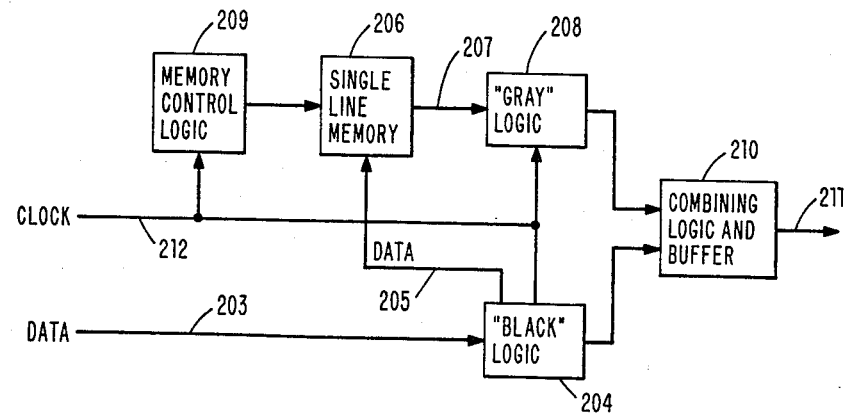
FIG. 4 is a block diagram of the enhancement circuitry of FIG. 3.

FIG. 4 is a more detailed block diagram of the enhancement circuitry 202. In FIG. 4, incoming data from the character generator is received on line 203 as input to logic circuits 204. In the logic circuit 204, the incoming data is analyzed such that any single pel data appearing in the scan direction is modified to provide an enlarged black pel. Data from the character generator is fed from the logic circuits 204 over line 205 to a memory 206. The data is read out of memory 206 over line 207 to a gray logic circuit 208 so that any single pel lines appearing in a direction parallel to scan may receive adjacent gray pels and thereby be enlarged. Data stored in memory 206 is read out under the control of logic 209. Combining logic and buffer circuits 210 receive the output of the black and gray logic circuits and combine them to produce signals representative of the enhanced data. These signals are sent to the laser drive circuitry 201 as shown in FIG. 3. The various logic circuits in FIG. 4 are clocked by pulses received on line 212.

Figure 5A:
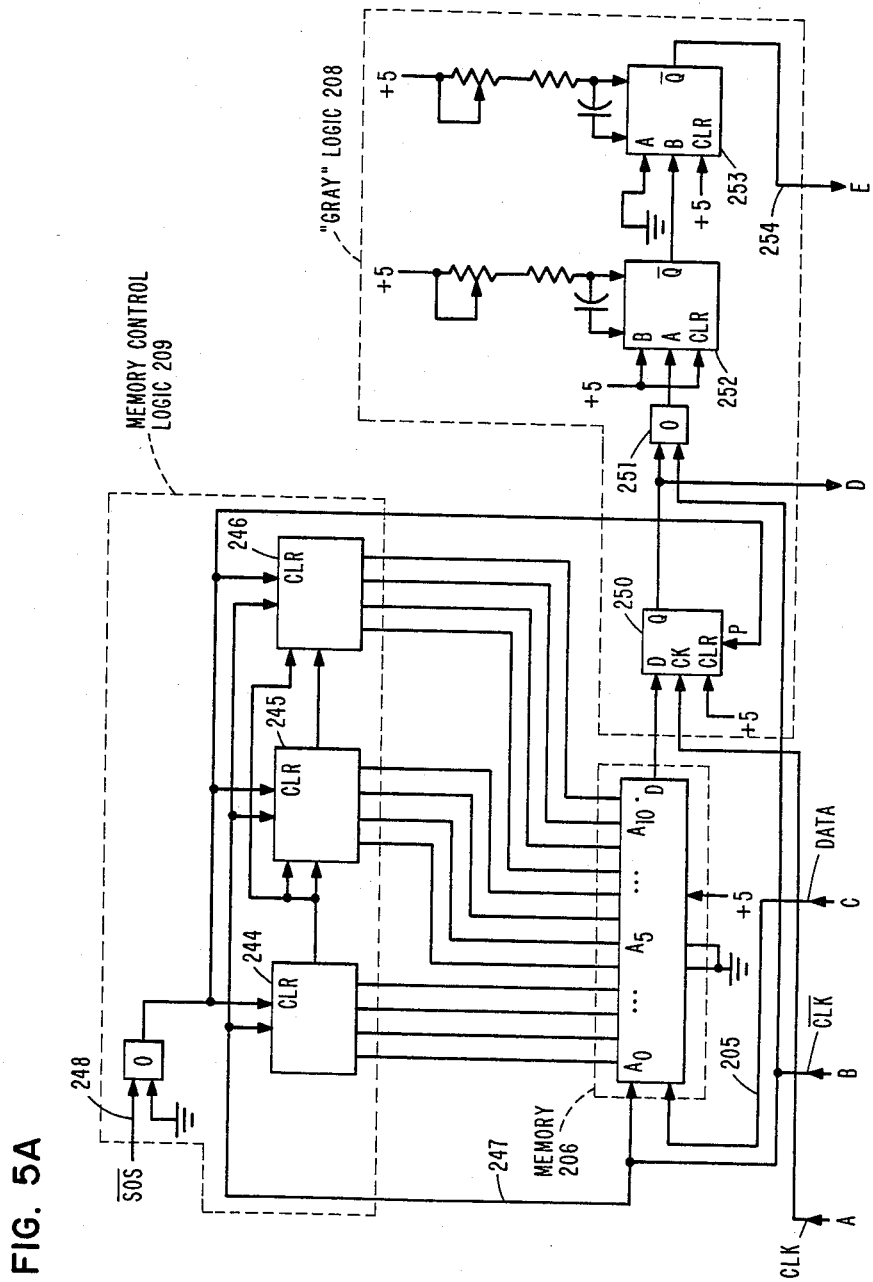
FIG. 5, comprised of FIGS. 5A and 5B, is a detailed circuit diagram of a particular embodiment of the enhancement circuitry.
Figure 5B:
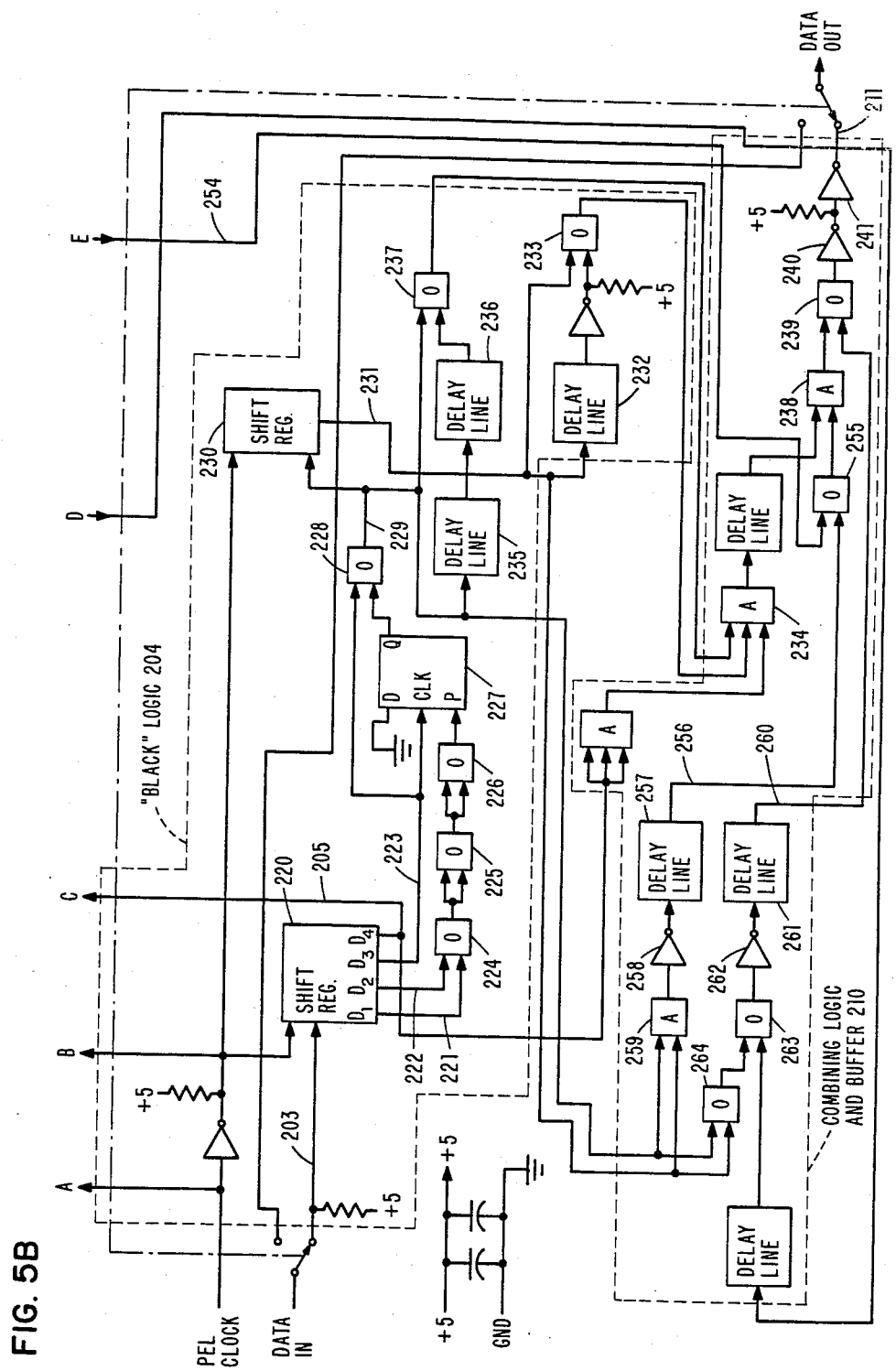

FIG. 5, comprised of FIGS. 5A and 5B, is a detailed circuit diagram to implement the block diagram shown in FIG. 4. In FIG. 5, data signals are received from character generator 200 (FIG. 3) on line 203 and are passed into shift register 220. Output signals from shift register 220 are provided on lines 221, 222, 223, and 205. The data appearing on these four lines are identical but are removed in time by one clock pulse each. Note that line 205 is connected to the gray logic circuit and passes data from the character generator to the single line memory 206.

In the "black logic" circuit 204, data signals on line 221 are passed to an OR circuit 224 where they are added to data signals on line 222. After an appropriate delay provided by OR circuits 225 and 226, the output of OR circuit 224 is fed into the preset input on latch circuit 227. Note that data signals on line 223 are used as a clock for latch 227. The output signals of latch 227 are fed to an OR circuit 228 where the signals are added to the data signals on line 223. The output of circuit 228 is fed over line 229 to the shift register 230 and from there over line 231 to a time delay circuit 232. After an appropriate time delay, the signals are then added to the output of shift register 230 at OR gate 233 and sent to AND circuit 234.

The output signals of OR gate 228, appearing on line 229, are also connected to a delay circuit 235 and from there to variable delay circuits 236. The output signals of variable delay circuits 236 are fed to OR gate 237 where the signals are added to the output signals of OR gate 228 appearing on line 229. The output signals of OR gate 237 are sent to AND circuit 234. An additional input to AND circuit 234 is the character data input from line 205. Through this combination of signals, as will be more fully described, the output of AND gate 234 is the data signal 205 together with an "added black" pulse for adding to the leading edge of a single pel pulse produced from OR circuit 237 and an "added black" pulse produced from OR gate 233 for adding to the trailing edge of the single pel data pulse. In that manner, the length of time during which the single pel pulse is produced is increased on both the trailing and leading edges. The output of AND circuit 234 is fed through AND circuit 238 and OR circuit 239 before presentation to the laser drive circuits 201 (FIG. 1). Inverting circuits 240 and 241 act as power amplifying elements to produce a signal of the desired amplitude on line 211.

For the gray logic circuit 208, note that data signals from the character generator are supplied over line 205 to memory 206. Memory circuit 206 is sequentially addressed by the memory control logic 209 which includes counters 244, 245, and 246. These counters are clocked by the complement of the clock signal appearing on line 247 which also clocks data on line 205 into memory 206. As data signals are sequentially read into memory 206, data signals from the preceding line are read out into latch circuit 250. Next the data signals are sent to OR circuit 251 where the signals are added to the complement of the clock signal. The output of OR circuit 251 is fed to a single shot circuit 252. The output of circuit 252 is fed to a second single shot circuit 253. The output of circuit 253 are "gray" pulses which have been centered in the pel period and reduced in size to produce gray. These signals appear on line 254 and are fed to OR circuit 255 in combining logic and buffer circuit 210. The output of OR circuit 255 is passed to AND circuit 238 where the gray pulses are added to the black pulse signals produced from AND gate 234. Thus, the output of AND gate 238 contains both gray pel and added black pel enhancement information and that data is passed through OR gate 239 to eventually reside on line 211 for input to the laser drive circuitry.

Note that at the beginning of each scan line, the memory control logic is initialized by the complement of the start-of-scan signal appearing on line 248.

OR gates 255 and 239 in the combining logic and buffer circuit 210 are optional gates which are used in this particular implementation of the enhancement circuits to account for special case conditions where it may be desirable to inhibit the enhancement signal. OR gate 255 receives an input over line 256 from a delay circuit 257. Delay circuit 257 receives an input from an inverting circuit 258 which in turn inverts the output of AND gate 259. One input of AND gate 259 is line 229 which is the output of OR gate 228. The second input to AND gate 259 is line 231 which carries the output of OR gate 228 shifted by two clock pulses.

OR gate 239 has an input received over line 260 which is connected to delay circuit 261. The input to delay circuit 261 is received from inverting circuit 262 which inverts the output of OR gate 263. One input to OR gate 263 is received from OR gate 264 which adds together the signal on line 229 with the signal on line 231. The other input at OR gate 263 is the data signal from the gray logic circuit and therefore is data from the line immediately preceding that line being printed.

D. Circuit Operation

FIG. 6, comprised of FIGS. 6A-6E, is a timing diagram which will be used to explain the operation of the circuit shown in FIG. 5.

Figure 6A:
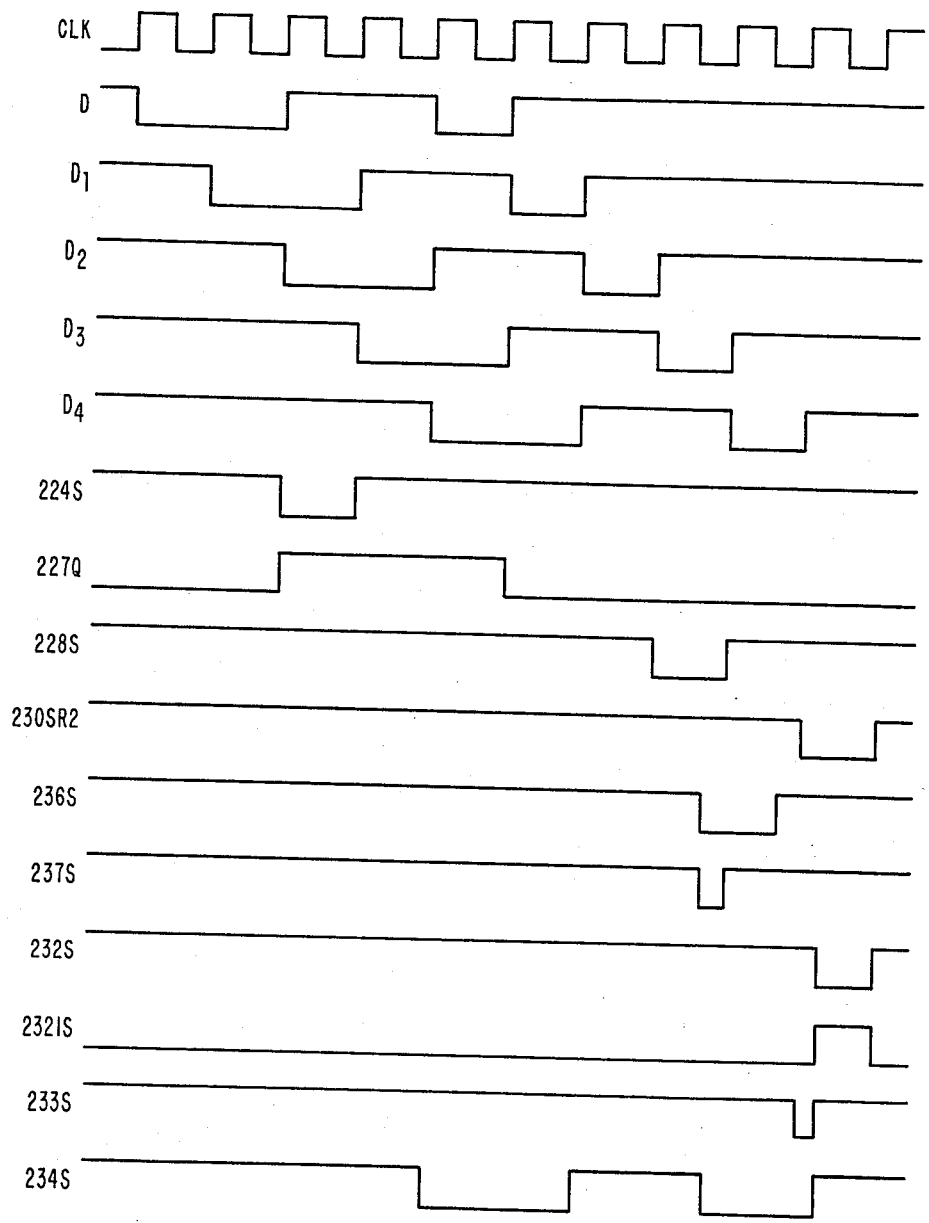
FIG. 6, comprised of FIGS. 6A–6E, is a succession of timing diagrams for use with the circuit of FIG. 5.

FIG. 6A is the timing diagram for the black logic circuit 204. The object of the black logic circuit is to provide an enlarged black pel signal for a single pel width black line appearing perpendicular to the scan direction. This is accomplished by extending the period of time somewhat beyond the ordinary pel time during which the laser is modulated to provide a single black pel. That is, in an implementation which uses positive development, the laser beam is turned off for a period of time greater than a single pel period. In a negative development system, a similar approach would be used to enlarge a single pel width white line.

With reference to FIG. 5, note that incoming data signals appear on line 203 and are presented to the shift register 220. Four outputs of shift register 220 are provided on lines 221, 222, 223, and 205. With reference to FIG. 6A, data signals appearing on line 221 are illustrated as signal D1. Also in FIG. 6A, signals D2 represent data on line 222, signals D3 data on line 223 and signals D4 data on line 205. Note that each of these data signals are exactly the same except that they are shifted by one cycle.

OR circuit 224 adds signals D1 and D2 and for the particular data illustrated in FIG. 6A, produces signals 224S. After an appropriate delay by gates 225 and 226, signals 224S are placed on the preset input of latch 227. Signals D3 clock latch 227 such that the output signals 227Q are as shown in FIG. 6A.

Signals D3 are OR'd with signals 227Q at OR gate 228 to provide signals 228S as shown on FIG. 6A. Note that the signals 228S contain a "black" pulse in the cycle previous to the single width black pulse appearing on the data signals D4. Note also that the multiple width black data signal in D4 does not appear in signals 228S. Thus, signals 228S are data signals which contain a leading black pulse at locations corresponding to print data containing a single pel width black pulse only.

Signals 228S are fed into shift register 230 and a shift of two cycles occurs therein before the output of the shift register is tapped. The output of shift register 230 is shown on FIG. 6A at 230SR2. Note here that the shape of signals 230SR2 contain a black pulse in the cycle immediately succeeding the cycle in which the single width black pel appears in data signals D4. Thus, circuits have been provided in which a single pel width black pulse in the data stream is preceded and succeeded by black pulses.

The leading edge black pulse is processed in delay circuit 236 in order to reduce the size of the leading edge black pulse to a desired width. Similarly, the succeeding black pulse signal is processed in delay circuits 232 to provide a desired width for the trailing edge black pulse. Referring again to FIG. 6A, note that the delay circuits 236 provide output signals 236S which are the delayed preceding black pulse signals. Signals 236S are OR'd with signals 228S to provide output preceding black pulse signals 237S. Delay circuits 232 provide signals 232S which are inverted to provide signals 232IS. The latter signals are added to the succeeding black pulse signal 230SR2 to produce succeeding black pulse output signals 233S.

Finally, AND circuit 234 receives data signals D4 with the single pel leading edge black pulse signals 237S and the single pel trailing edge black pulse signals 233S to provide output signals 234S in which single pel width black pulse signals are expanded slightly on both the leading and trailing edges.

Figure 6B:
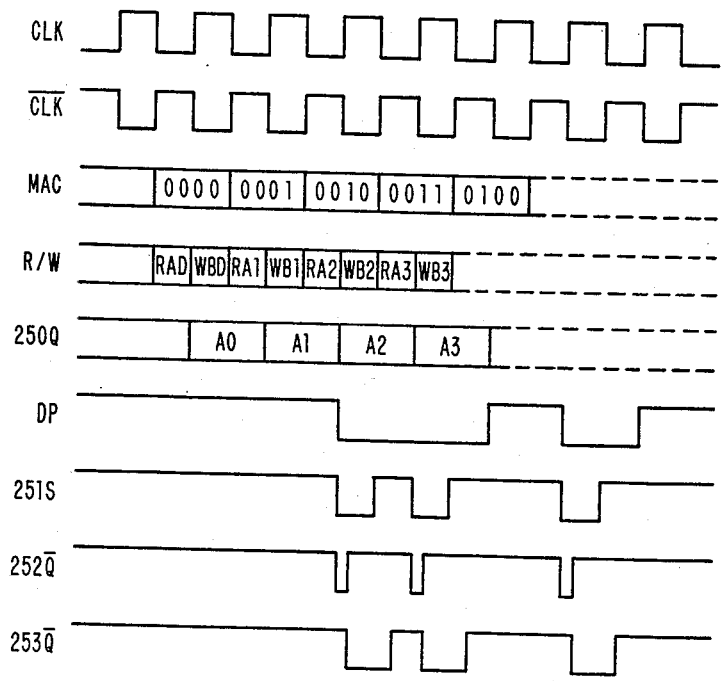

FIG. 6B, taken together with the gray logic circuits 208 of FIG. 5, illustrate the operation of the gray logic circuits 208 to provide a gray pel in a direction parallel to scan in a pel location directly adjacent to each black pel. In the particular implementation provided in FIG. 5, it makes no difference whether the black pel areas are single pel or multiple pel in width. A gray pel is always added on one edge of the black line and in the particular implementation of FIG. 5, it is always added in pel areas immediately adjacent the trailing edge of the black line.

Before referring to FIG. 6B, note that data signals D4 (FIG. 6A) are input to memory 206. Note also that the complement of the start-of-scan signal (FIG. 5) is input on line 248 so that the counters 244, 245, and 246 are initialized at the start-of-scan. After initialization, as the counters begin to count in accordance with clock cycles, the memory address control produces access to memory as shown by signals MAC in FIG. 6B. Since the counters are clocked by the complement of the clock pulse, location 0 is accessed on the first cycle, location 1 on the second cycle, location 2 on the third cycle, etc. Memory 206 is designed such that a read cycle occurs on the first half of the clock pulse and a write cycle on the second half. Thus, data signals from the character generator for the line immediately preceding the line now being printed and which were read into memory 206 during the printing of the preceding line are read out of memory on the first half cycle while the incoming data D4, that is, the data signals of the next line (current line being printed), are written into memory 206 on the second half cycle. With reference to signals R/W shown in FIG. 6B, data for pel 0 in line A is read out of memory on the first half cycle while data for pel location 0 in line B is read into memory on the second half cycle. On the third half cycle, pel data at location 1 in line A is read into memory while on the fourth half cycle pel data for location 1 in line B is written into memory. The process continues so that as data signals for the line currently being processed are read into memory, they replace data for the preceding line.

As data signals are read out of memory, they are latched at latch circuit 250 to provide a full cycle of pel data accessibility at the output signals 250Q. Thus, the output signals 250Q contain a succession of cycles containing the information in the line A, that is, the preceding line to the line currently being processed in the black logic circuit 204 and being sent to the printhead over line 211.

Signal DP shown in FIG. 6B, is the pel data signal for line A. Note that signal DP contains one multiwidth pel signal and one single pel width data signal. With signal DP as input to OR circuit 251, output signal 251S takes the form as shown. Note that the multi-pel width data signal in signal DP has been broken into successive pulses.

Signal 251S is used as input on pin A of a single shot multi-vibrator circuit 252. Circuit 252 is designed to fire on negative-going transitions of the input on pin A thus providing an output signal 252$\overline{Q}$ as shown in FIG. 6B. Signal 252$\overline{Q}$ is then used as input to pin B of single shot multi-vibrator circuit 253 to produce an output signal 253$\overline{Q}$.

The observation can now be made that signal 253$\overline{Q}$ contains black pulses at each location of a black pulse in the data signal DP except that the width of the pulse has been altered to remain on for a shorter period of time than a full black pulse. As a consequence, the signal produced at 253$\overline{Q}$ is in actuality a gray pulse and it corresponds in location to each black pulse in the data of the line preceding the line now being printed.

It should also be noted that the position of the leading edge of the gray signal 253$\overline{Q}$ is determined by the single shot circuit 252 and by adjusting circuit 252, the position of the leading edge of the gray pulse within the pel period can be adjusted. Similarly, circuit 253 determines the width of the gray pulse, that is, it sets the trailing edge of the gray pulse, and by adjusting circuit 253, the width of the gray pulse can be adjusted. Thus, circuits 252 and 253 provide gray pels of appropriate width which can be centered in the pel area of each black pulse appearing on the preceding data line. If desired, the gray pulse can be moved off-center toward the black area. In any case, the circuit provides for adjusting the width of the gray pel which adjusts the amount by which the black pel is broadened.

Figure 6C:
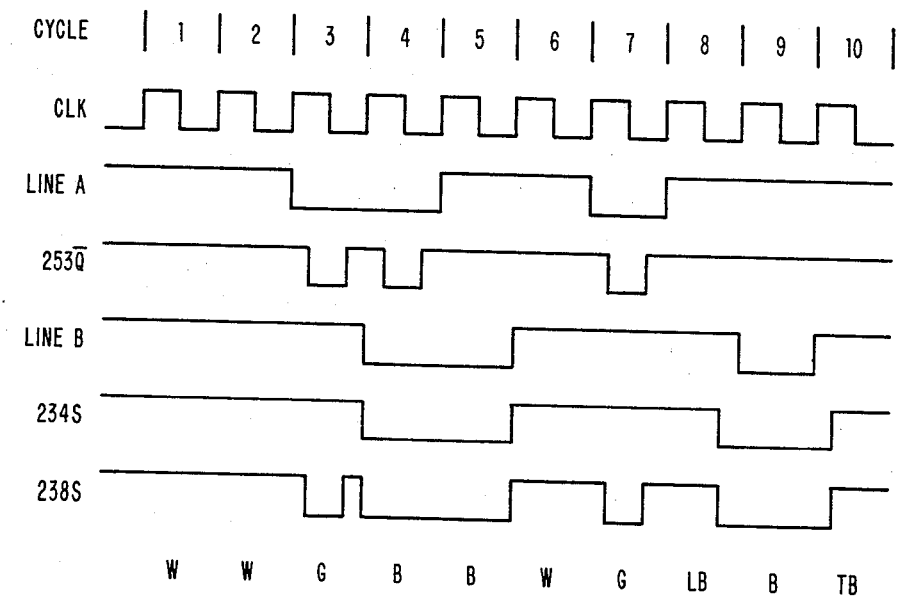

FIG. 6C illustrates the combining logic and buffering circuits 210 which provide the output signal to the printhead for printing the data of the current line, data D4 (FIG. 6A). Since the output signals of enhancement circuits for black logic and gray logic are added into data D4, and since the gray logic circuit works from the data in a preceding line which had been held in memory 206, data are shown in FIG. 6C for a preceding line, line A. The processing of the data in line A by the gray logic circuits produces signals 253$\overline{Q}$. Ignoring for a moment the effect of the OR circuit 255, signals 253$\overline{Q}$ are fed into AND circuit 238 where the gray signals are ANDed with output signals 234S. Signals 234S represent data signals D4 together with any expanded black pulses as already explained with reference to FIG. 6A. Thus, when line B contains data as shown, AND circuit 238 produces output signals 238S. Note that as a result of the use of the enhancement circuit, normal data in line B from the character generator are changed by adding a gray pulse in cycle 3, a gray pulse in cycle 7, an added black at the leading edge in cycle 8, and a trailing black in cycle 10. For completing purposes of illustration, the line preceding line A, line IA, is shown as an all white line.

With reference to FIG. 7A, the various pel signals in each of the lines shown in FIG. 6C are illustrated over a ten-cycle period. In FIG. 7A, line IA containing all white pels in each of the illustrative ten pel locations is printed by the movement of the laser beam in the scan direction from top to bottom. Next, line A is printed and is shown with two white pels in locations 1 and 2, two black pels in locations 3 and 4, two white pels in locations 5 and 6, an expanded single width black pel at location 7, followed by three white pels. Next, line B is printed and as shown in FIG. 6C, cycles 1 and 2 contain white pels, cycle 3 contains a gray pel, cycles 4 and 5 contain black pels, cycle 6 is a white pel, a gray pel at cycle 7, and then the expanded black pel at pel position 9 with leading and trailing edge expansion in cycles 8 and 10.

For illustrative purposes, let us assume that the character generator provides line C as an all white line. In such a case, the output of the enhancement circuits would provide white pulses at locations 1, 2, and 3, gray pulses at locations 4 and 5, white pulses at locations 6, 7, and 8, a gray pulse at location 9, and a white pulse at location 10. Note that gray pulses appear in any scan in which the preceding line contained a black pulse and the current line contains a white pulse. Thus the enhancement circuit has added gray pulses in a direction parallel to scan at each transition of black to white and has added expanded black pulses for each single pel width black pulse in a direction perpendicular to scan.

Note that we have not yet considered the effect of OR gates 255 and 239 on output signals 238S being fed on line 211 to the printhead. Circuit 255 is intended to inhibit the enhancement circuits under the special case condition where a gray pulse appears in the same pel location as an added black pulse. FIG. 7B illustrates the type of data which would generate such a condition. The enhancement circuits operate at pel locations 300 and 301 to provide the condition which will be inhibited by OR circuit 255.

Figure 6D:
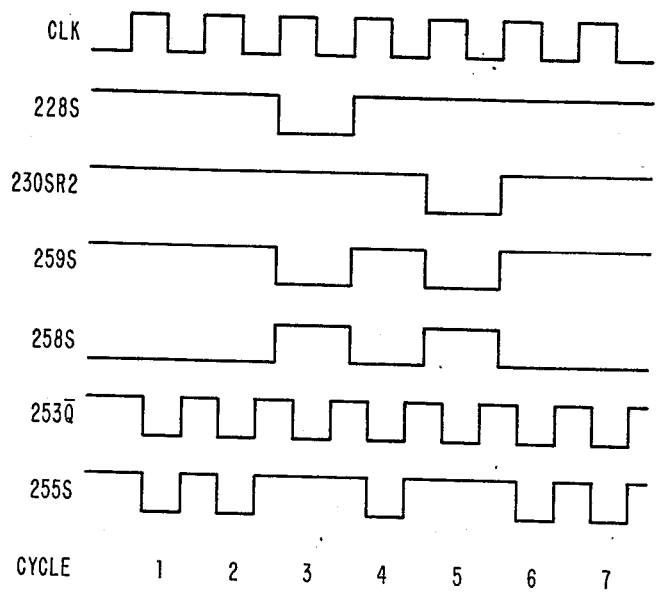

FIG. 6D is a timing circuit which illustrates the inhibiting circuit 255. The gray logic signal is provided at one input to OR circuit 255. The other input is present on line 256 and is received ultimately from AND gate 259. Input signals to AND circuit 259 are signals 228S and 230SR2. These signals are shown in FIG. 6D and are the signals which provide a black pulse in the pel position immediately preceding and immediately succeeding a single pel width black pulse. The output of AND gate 259 is shown as signal 259S and after passing through inverting circuit 258, signal 258S is provided. That signal then becomes the input at OR gate 255 where it is added to the gray signals 253$\overline{Q}$.

Signals 253$\overline{Q}$ show a succession of gray pulses. With that input, the gray signals in cycles 3 and 5 have been inhibited as shown in signals 255S. Note that cycle 3 is the cycle in which a gray signal occurs simultaneously with a leading black pulse while cycle 5 is the cycle in which a gray pulse occurs simultaneously with a trailing edge black pulse. Referring again to FIG. 7B, note that these are the conditions present at locations 300 and 301 and therefore the operation of circuit 255 acts to inhibit the printing of the gray pulse in those locations.

The operation of the OR gate 239 is to inhibit the printing of a gray pulse, a leading edge added black pulse, and a trailing edge added black pulse when all three of these pulses occur in the same pel location. This kind of condition is shown with reference to FIGS. 7C and 7D. FIG. 7C illustrates actual data where a single white pel signal is completely surrounded by black pels. FIG. 7D shows the data utilizing the enhancement circuits of FIG. 5. Note that in this particular situation, a gray pulse, an added black pulse on the trailing edge, and an added black pulse on the leading edge all occur at pel location 302. If the enhancement circuits were allowed to operate in this situation, the white pel at location 302 might be indistinguishable. Thus, OR circuit 239 has been added to inhibit the operation of the enhancement circuits when the condition shown at pel location 302 occurs.

Figure 6E:
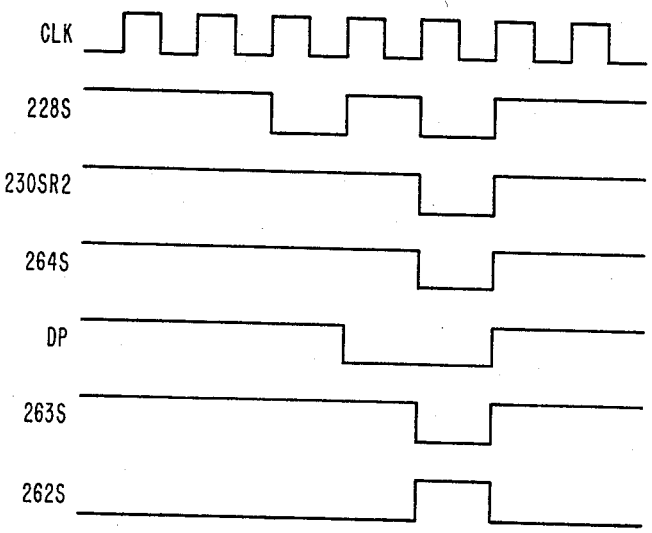

Input to OR gate 239 on line 260 is ultimately a result of the input at OR gate 264 of signals 228S and 230SR2. These two signals are shown in FIG. 6E and are the signals which represent the leading edge black pulse and the trailing edge black pulse. For the conditions shown in FIG. 7C, these two signals are as shown in FIG. 6E. The output signals 264S of OR gate 264 are shown in FIG. 6E and are input to OR gate 263 where they are added to the data signals DP of the line immediately preceding the line now being printed. The signals DP are taken from the output of latch 250 in the gray logic circuit. Output signals 263S are inverted to produce signals 262S and those signals are ultimately fed to the OR gate 239. It will be observed that signals 262S are continually low except for that particular cycle in which both an added black and a trailing black pulse occur and in which data from the preceding line causes a gray pulse to occur. Thus, the output signals 262S force a white pel signal in that particular cycle thus satisfying the requirements of the condition of pel location 302 in FIG. 7D.

Variations on the particular implementation are within the scope of this invention. For example, fine lines might be of more than one pel width. Application of the principles disclosed herein lead to circuits for that task. Also, the particular implementation described herein provides duty cycle modulation for gray pel enhancement. Such an implementation is preferable for solid-state laser sources which are readily switchable. If a different source is used, it might be more desirable to control laser beam intensity. As stated above, the principles of this invention can be used with light sources other than laser beams including nonscanning light sources and can be used regardless of whether negative or positive development systems are present in a particular machine.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. An electrophotographic printing machine comprising:
   drive means;
   movable carrier means driven by said drive means;
   photoreceptive material mounted on said movable carrier means for cyclic movement through electrophotographic process stations;
   charge corona means located at a first station for placing a relatively uniform electrostatic charge on the surface of said photoreceptive material;
   exposure means located at a second station for selectively discharging the charged photoreceptive material to cause the formation of a latent image on said material;
   toner for developing said image;
   developer means located at a third station for applying said toner to said image to produce a developed image;
   image receiving material;
   transfer means located at a fourth station for transferring said developed image from said photoreceptive material to said image receiving material;
   paper storage means for holding a supply of image receiving material;
   a finishing station;
   paper forwarding means for serially moving image receiving material from said storage means through the transfer station to said finishing station;
   control means for operating said exposure means, said control means comprising:
   a character generator for producing data signals to drive said exposure means to produce the desired image on said photoreceptive material; and
   enhancement means for altering certain of said data signals before presentation of said signals to said exposure means to produce broadened image lines on said photoreceptor where said lines occur in either of two dimensions perpendicular to each other.

2. The machine of claim 1 wherein said enhancement means produces a first type of altered signal to expand said data signals, the expanded signal modulating said exposure means to produce a broadened image line in a first dimension.

3. The machine of claim 1 wherein said enhancement means produces a second type of altered signal which modulates said exposure means to produce an intermediate discharge level adjacent the transition from fully charged levels to fully exposed levels to provide a broadened image line in a second dimension.

4. The machine of claim 2 wherein said enhancement means produces a second type of altered signal which modulates said exposure means to produce an intermediate discharge level adjacent the transition from fully charged levels to fully exposed levels to provide a broadened image line in a second dimension.

5. The machine of claim 2 wherein said enhancement means further includes:
   means for receiving a stream of data signals representing a first print line;
   means for analyzing said data stream to identify data signals representing fine line data, said fine line data signals having a first value level;
   means for producing a leading signal of said first value directly leading said fine line data signals;
   means for producing a trailing signal of said first value directly trailing said fine line data signals; and
   means for combining said fine line data signals with said leading signal and said trailing signal to provide expanded fine line data signals of a first value level within the data signal stream.

6. The machine of claim 5 wherein said expanded fine line data signals are produced for modulating an image one pel in width.

7. The machine of claim 3 wherein said enhancement means further includes:
   means to store a stream of data signals representing a first line;
   means for reading said stored data signals during reception of a stream of data signals representing the second line; and
   means for operating upon said data signals representing said first line to produce a separate data signal corresponding to the location of each data signal of a first level in said first line, said separate signals capable of producing a modulated exposure to said intermediate discharge level on said photoreceptive material.

8. The machine of claim 7 further including means for combining said separate data signal with said stream of signals representing said second line before presentation of the second line data stream to said exposure means.

9. The machine of claim 8 further including means for reducing the width of each of said separate signals to a time period less than a full data signal.

10. The machine of claim 4 wherein said enhancement means further includes:
    means for receiving a stream of data signals representing a first line;

means for analyzing said data stream to identify data signals representing fine line data, said fine line data signals having a first value level;

means for producing a leading signal of said first value directly leading said fine line data signals;

means for producing a trailing signal of said first value directly trailing said fine line data signals; and means for combining said fine line data signals with said leading signal and said trailing signal to provide expanded fine line data signals of a first value within the data signal stream.

11. The machine of claim 10 wherein said expanded fine line data signals are produced for modulating an image one pel in width.

12. The machine of claim 11 wherein said enhancement means further includes:

means to store a stream of data signals representing a first line;

means for reading said stored data signals during reception of a stream of data signals representing the second line; and means for operating upon said data signals representing said first line to produce a separate data signal corresponding to the location of each data signal of a first level in said first line, said separate signals capable of producing a modulated exposure to said intermediate discharge level on said photoreceptive material.

13. The machine of claim 12 further including means for combining said separate data signals with said stream of signals representing said second line before presentation of the second line data stream to said exposure means.

14. The machine of claim 13 further including means for reducing the width of each of said separate signals to a time period less than a full data signal.

15. The machine of claim 4 wherein said enhancement means further includes:

means to store a stream of data signals representing a first line;

means for reading said stored data signals during reception of a stream of data signals representing the second line; and means for operating upon said data signal representing said first line to produce separate data signals corresponding to the location of each data signal of a first level in said first line, said separate signals capable of producing a modulated exposure to said intermediate discharge level on said photoreceptive material.

16. The machine of claim 15 further including means for combining said separate data signals with said stream of signals representing said second line before presentation of the second line data stream to said exposure means.

17. The machine of claim 16 further including means for reducing the width of each of said separate signals to a time period less than a full data signal.

18. In a printing machine, imaging means for producing an image to be reproduced on work material, control means for operating said imaging means to create the desired pattern on said material, in accordance with image producing data signals, said control means including enhancement means for enhancing the print output of said printing machine by broadening fine lines occurring in either of two perpendicular directions.

19. The machine of claim 18 wherein said imaging means includes light source means and means to direct illumination in a scanning motion across work material comprised of photoreceptive material and wherein said enhancement means broadens fine lines in a direction parallel to the scan direction by modulating said light source means to produce an intermediate discharge level on said photoreceptive material directly adjacent low discharge levels produced in accordance with fine line data.

20. The machine of claim 19 wherein said fine line data, without enhancement, produces a line one picture element in width.

21. The machine of claim 18 wherein said enhancement means broadens fine lines in a direction perpendicular to the scan direction by modulating said light source means to produce expanded picture elements of a low discharge level on said photoreceptive material in accordance with fine line data.

22. The machine of claim 21 wherein said fine line data, without enhancement, produces a line one picture element in width.

23. The machine of claim 19 wherein said enhancement means broadens fine lines in a direction perpendicular to the scan direction by modulating said light source means to produce expanded picture elements of a low discharge level on said photoreceptive material in accordance with fine line data.

24. The machine of claim 23 wherein said fine line data, without enhancement, produces a line one picture element in width.

25. The machine of claim 23 further including a character generator for providing a stream of data signals and wherein said enhancement means is connected to receive the data stream from said character generator and alter selected signals to provide fine line enhancement, the output of said character generator and enhancement means connected to drive said light source means.

26. The machine of claim 25 wherein said enhancement means further includes:

means for analyzing said data stream to identify data signals representing fine line data signals having a first value level;

means for producing a leading signal of said first value directly leading said fine line data signals;

means for producing a trailing signal of said first value directly trailing said fine line data signals; and means for combining said fine line data signals with said leading edge signal and said trailing edge signal to provide expanded fine line data signals of a first value level within the data signal stream.

27. The machine of claim 26 wherein said enhancement means further includes:

means to store a stream of data signals representing a first line;

means for reading said stored data signals during reception of a stream of data signals representing the second line; and means for operating upon said data signals representing said first line to produce separate data signals corresponding to the location of each data signal of a first level in said first line, said separate signals capable of producing a modulated exposure to said intermediate discharge level on said photoreceptive material.

28. The machine of claim 27 further including means for combining said separate data signals with said stream of signals representing said second line before presentation of the second line data stream to said light source means.

29. The machine of claim 28 further including means for reducing the width of each of said separate signals to a time period less than a full data signal.

30. The machine of claim 29 wherein said fine line data, without enhancement, produces a line one picture element in width.

31. A method for broadening the width of fine lines in a printed image produced by an electrophotographic printing machine, comprising the steps of:
charging the photoreceptive material of said machine to a first charge level;
utilizing exposure means to selectively discharge portions of said photoreceptive material;
obtaining said selective discharge by modulating said exposure means to discharge said photoreceptive material to a second charge level by exposing said material in discrete picture elements in accordance with a stream of data signals;
altering said stream of data signals in a first manner to produce expanded picture elements in a first dimension to broaden fine lines in said first dimension; and
altering said stream of data signals in a second manner to produce an intermediate charge level on said photoreceptive material in picture elements directly adjacent fine line picture elements in a second dimension perpendicular to said first dimension.

32. The method of claim 31 wherein said step of altering said stream of data signals in a first manner further includes the steps of:
identifying fine line data signals;
producing a leading edge expansion of said fine line data signals; and
producing a trailing edge expansion of fine line data signals;
thereby producing expanded data signals with which to modulate said exposure means to broaden said fine lines in said first dimension.

33. The method of claim 31 wherein said step of altering said stream of data signals in a second manner further includes the steps of:
storing a first group of data signals representing a first line;
reading said stored signals simultaneously with the reception of a second group of data signals representing a second line; and
operating upon said groups of data signals to produce an altered stream of data signals to produce said intermediate charge level.

34. The method of claim 33 wherein said step of operating upon said groups of data signals further includes the steps of:
in said first group of signals, identifying those signals of a value level which will modulate said exposure means to produce said second charge level on said photoreceptive material;
producing a modified signal to replace each of the identified signals in said first group, said modified signals for producing said intermediate charge level on said photoreceptive material; and
combining said modified signals with said second group of signals prior to modulating said exposure means.

35. In a method of enhancing the printing of fine lines by an electrophotographic printing machine which method includes a first group of steps to add gray picture elements directly adjacent picture elements defining a fine line in a first dimension, and includes a second group of steps to expand picture elements defining a fine line in a second dimension perpendicular to said first dimension, the improvement comprising the steps of:
inhibiting the output signal of one of the groups of enhancement steps when an expanded picture element coincides with a gray picture element in the same picture element area.

36. In a method of enhancing the printing of fine lines by an electrophotographic printing machine which method includes a first group of steps to add gray picture elements directly adjacent picture elements defining a fine line in a first dimension, and includes a second group of steps to expand picture elements defining a fine line in a second dimension perpendicular to said first dimension, the improvement comprising the steps of:
inhibiting the output signals of both groups of enhancement steps when two expanded picture elements coincide with a gray picture element in the same picture element area.

* * * * *